US011628349B2

(12) United States Patent
Sullivan et al.

(10) Patent No.: US 11,628,349 B2
(45) Date of Patent: Apr. 18, 2023

(54) POSITIONAL DETECTION SYSTEM

(71) Applicants: Patrick Sullivan, Bristol (GB);
Mohamed Abolkheir, Bristol (GB);
Shyqyri Haxha, Bedfordshire (GB);
Paul Hogg, Bedfordshire (GB)

(72) Inventors: Patrick Sullivan, Bristol (GB);
Mohamed Abolkheir, Bristol (GB);
Shyqyri Haxha, Bedfordshire (GB);
Paul Hogg, Bedfordshire (GB)

( * ) Notice: Subject to any disclaimer, the term of this patent is extended or adjusted under 35 U.S.C. 154(b) by 0 days.

(21) Appl. No.: 17/628,872

(22) PCT Filed: Jul. 23, 2020

(86) PCT No.: PCT/GB2020/051767
§ 371 (c)(1),
(2) Date: Jan. 20, 2022

(87) PCT Pub. No.: WO2021/014161
PCT Pub. Date: Jan. 28, 2021

(65) Prior Publication Data
US 2022/0241667 A1 Aug. 4, 2022

(30) Foreign Application Priority Data

Jul. 23, 2019 (GB) ...................................... 1910548
Jul. 22, 2020 (GB) ...................................... 2011321

(51) Int. Cl.
A63B 71/06 (2006.01)
H04W 4/70 (2018.01)
A63B 24/00 (2006.01)
A63B 43/00 (2006.01)
G01S 17/48 (2006.01)
G01S 17/66 (2006.01)

(52) U.S. Cl.
CPC ...... A63B 71/0605 (2013.01); A63B 24/0062 (2013.01); A63B 43/004 (2013.01); G01S 17/48 (2013.01); G01S 17/66 (2013.01); H04W 4/70 (2018.02); A63B 2220/13 (2013.01)

(58) Field of Classification Search
CPC ............ A63B 71/0605; A63B 24/0062; A63B 43/004; A63B 2220/13; G01S 17/48; G01S 17/66; H04W 4/70
See application file for complete search history.

(56) References Cited

U.S. PATENT DOCUMENTS

| 2004/0171388 A1 | 9/2004 | Couronne et al. |
| 2006/0160639 A1 | 7/2006 | Klein |
| 2014/0256478 A1 | 9/2014 | Gale |
| 2016/0144268 A1 | 5/2016 | Stimac |
| 2017/0074652 A1* | 3/2017 | Send ..................... G06F 3/0423 |
| 2018/0193694 A1 | 7/2018 | Bergman |

FOREIGN PATENT DOCUMENTS

| CA | 2883098 A1 * | 6/2012 | ............. A41D 1/002 |
| DE | 2527465 A * | 12/1976 | ......... A63B 71/0605 |
| DE | 2527465 A1 | 12/1976 | |
| DE | 2628908 A1 | 1/1978 | |
| WO | 2001/066201 A1 | 9/2001 | |
| WO | 2014/043506 A1 | 3/2014 | |

OTHER PUBLICATIONS

International Search Report and Written Opinion for PCT/GB2020/051767, dated Nov. 13, 2020 in 11 pages.
Examination Report for Application No. GB2011321.3, dated Aug. 13, 2021 in 4 pages.
Intention to Grant for Application No. GB2011321.3, dated Sep. 2, 2021 in 2 pages.

* cited by examiner

Primary Examiner — Jeffrey S Vanderveen
(74) Attorney, Agent, or Firm — Knobbe, Martens, Olson & Bear, LLP

(57) ABSTRACT

A sports and performance media positional detection system, comprising: at least two elements, with at least one element involved in the sporting activity; a power source; and machine-to-machine communication, which are collectively arranged such that if any two or more elements interact, their electromagnetic properties can be detected thus allowing the position of the interacting elements to be communicated to a decision maker. The system can be applied to at least one stationary element, which can be the playing surface, lines defining the boundaries, or a set of goalposts; and at least one moving element, which could be a ball, footwear, or the participants themselves. The system can also be applied to performance media capture.

23 Claims, No Drawings

POSITIONAL DETECTION SYSTEM

This invention relates to a system for identifying the true location of objects or participants involved in a physical sport or game, relative to the environment in which the activity is being conducted. The invention also relates to a media positional system which can be used in performance media capture and computer gaming.

In many sports and games, the outcome is decided by the location of objects or participants, such as in tennis where the ball touching the line is 'in' and on the wrong side of the line is 'out'. Traditionally, the decisions have been made on the basis of manual, visual inspection by a designated referee or umpire. In the past century, however, sport has become a commercial industry and the outcomes can have great financial and social implications on both a microscopic and macroscopic level. Therefore, precision in the decision-making process is significant and many sports and games exist with rules depending on positional information and known, discrete boundaries.

There have been technological advances in sport as the financial investment has grown. Many of these use visual inspection, following on from the traditional, manual method. Video replays have been widely used in professional rugby union since 2000 and Hawk-Eye have developed sophisticated systems for tracking balls visually in multiple sports since used first in tennis in 2002. The company recently were solely responsible for judging the lines in tennis tournament 'Battle of the Brits' (2020) using cameras and visual means to determine whether the tennis ball landed inside or outside of the lines which define the playing surface without a human decision maker in the role of line judge.

Rather than using visual measurements and means, this invention takes a conceptual shift to solving disputed decisions in sport by detecting interactions between elements based on their material properties. The system minimises the risk of the referee's decision being disputed by determining clear, precise positional information and, in many cases, also saving time. The minimum viable positional detection system of the invention comprises of: at least two elements, with at least one element involved in the sporting activity; a power source, such as the electrical mains, a battery, or a solar cell; and machine-to-machine communication, which are collectively arranged such that if any two or more elements interact, the material properties of at least one element can be detected thus allowing the position of the interacting elements to be communicated to a decision maker, wherein the decision maker is a human referee, computing device, or artificial intelligence.

The invention may also be used alongside visual information provided during a game of sport, and to operate within the context of visual information. For example, in a game of rugby, the players, referee, and others are visually aware of the part of the field in which the ball and the action are situated. However, controversy arises when visual information is obstructed, and it is at that point that the invention provides decisive, non-visual information that an interaction has occurred. On that basis, the decision maker can infer the position of the interaction was, for example, in the try area.

The present invention is also applicable to performance media and in the gaming industry. In particular, the present invention is applicable to entertainment media, such as film and television, and its use for motion capture in games and animation. Traditionally, in the film/television industry, when creating special effects, due to the limited capability of current motion capture systems, these are typically captured inside on film sets or television sets. The present invention allows performance media capture to take place in multiple environments, including outside.

Similarly, in the video gaming industry and in animation, the present invention allows for more accurate motion capture of the face.

DETAILED DESCRIPTION

The present invention provides a sports and performance media positional detection system, comprising: at least two elements each of which has an electromagnetically interactive surface and machine-to-machine communication means, which are collectively arranged such that if two elements interact electromagnetically, the interaction is communicated by the machine-to-machine communication means to an output means.

The present invention also provides a sports and performance media positional detection system, as comprising: at least two elements each of which has an electrically conductive interactive surface; a power source connected to at least one element configured to form an electrical circuit when the surfaces of the at least two elements interact; and machine-to-machine communication means, which are collectively arranged such that if any two or more elements interact they create, a change in the electrical properties in the circuit which can be detected thus allowing the position of the interacting elements to be communicated by machine-to-machine communication means to an output means.

Surfaces of interest in the application are to be formed, on the external surface level, of an electrically conductive material, for example a coating of nickel-based paint, a coating of silver-based paint, and reduced graphene oxide. Other such conducting surfaces may also be selected. Preferably, an electrical circuit is formed on at least one of the surfaces of interest and the electrical properties, such as electrical resistance, continuously measured and recorded during the sporting activity. In the continuous time domain, the concept of an effective circuit is the electrically conductive elements which form the electrical circuit at a given time. In the system of the invention, the electrically conductive surfaces interacting at a given time form the effective circuit when at least one of the surfaces is naturally connected to a power source and preferably be connected to the measuring and capturing means. Interactions between the electrically interacting surfaces then affect the electrical properties of the effective circuit of the system because they increase the length of conductive material forming the effective circuit and the length of conductive material is proportional to the electrical resistance of the circuit which can be recorded using capturing means, such as digital multimeters, and communicated to decision makers using communication means. Software means is preferably utilised to interpret the electrical property changes into positional information and the outcome of application.

The concept of effective circuit and electrically conductive surfaces forming part of the effective circuit means that not all of the electrically conductive surfaces in the system require a circuit board to form connections to capturing means. The interaction between an unconnected electrically conductive surface and a connected electrically conductive surface affects the properties of the effective circuit and the capturing means has the required information about the relative position of the interacting surfaces. The reduced number of connected surfaces reduces the complexity of the system and improves clarity of communication for a decision maker and operating engineer.

In accordance with the present invention the ball in ball games may have detectable material properties without the need for physical contact, including but not limited to magnetic properties, thermal properties, or physical properties.

The scenarios given for which the invention could be applied in sport are as follows. In a first aspect, the invention may be used for providing positional information for where the ball is relative to the environment, which comprises, depending on the sport, of elements such as the playing surface, the lines defining the boundaries of the playing surface, and, in some sports, substantial apparatus with which participants and the ball interact with, such as goalposts. In a second aspect the invention may provide positional information for where a participant is relative to the environment. In a third aspect, the invention may provide positional information on where multiple participants are relative to each other as well as the environment. In a fourth aspect, the invention may interpret positional information for the purpose of performance analysis using artificial intelligence means. By way of clarification, the term "environment" refers to two things, the first being any game, and the second any medium in which the element interacts such as air, water, snow, ice, fog or any weather conditions such as rain. etc.

The invention and these aspects will now be described by way of example.

The term 'participant' is used to describe a person or animal who takes part in something, such as a sporting activity or for an actor or person involved in performance media capture. The terms 'participant' and 'player' are used interchangeably throughout this description.

In rugby union, a try has been scored when the ball is placed either on the tryline or in the designated try-scoring area beyond it. When there is clear visibility, a referee can see when the ball has been placed, but a common area of dispute is when visibility is impaired by several players surrounding the action. This can be even more problematic when the dispute is related to whether the ball has touched the line or not.

According to the invention, the rugby ball is coated substantially with electrically conductive material, as is the line and the try-scoring area. Preferably, the field of play would comprise of an artificial playing surface. Alternatively, the invention could be used with natural grass in the form of suitable material application, for example electrically conductive material such as nickel-based paint, silver-based paint and reduced graphene oxide. When any part of the ball comes into contact with the line or the try-scoring area, the surfaces interact and the effective circuit increases in length and thus a detectable change in resistance can be recorded on a sensor connected to the tryline or try-scoring area from out of the boundaries of the playing surface. The change then causes a clear signal to be communicated to the decision-maker, here the referee, indicating the ball has touched the line or try-scoring area. For example, this signal could be a message on a watch, a red light on the side of the pitch, a siren, or other clear means of communicating the decision. Similar situations occur in rugby league, and thereafter the term 'rugby' will be used generically.

This invention can also detect changes between other types of interacting surfaces within the physical environment of a sport. Remaining with rugby by way of another example, tries are also scored when the ball is pressed against the base of either of the two goalposts. The ball has a coating using an electrically conductive material, such as nickel-based paint, silver-based paint, or reduced graphene oxide, as does the two goalposts and the playing surface around the base of the goalposts. When the ball touches one of the goalposts at the same time as the playing surface around the base of the respective goalpost, the electrical properties of the effective circuit formed would change to detectable and known values for the scenario. When a try scored by this action is recorded, a clear signal is sent to the referee, such as a visual display, for example a light on the posts or a noise indicator. The above scenario can have numerous applications in different sports, including, for example, football (goalscoring and the ball being outside the touchlines), tennis (the ball being in or out), and cricket by way of a few examples. The invention is not intended to be limited to these sports and is applicable to many other sports.

In one aspect, the invention includes a ball comprising of material which can be detected and positioned in a three-dimensional spatial proximity by at least one sensor. The ball is a replicate of the common ball used in the sport of application, with the addition of material with properties that can transmit, receive, and interact with a desired device or sensor. Properties of the ball, such as thermal conductivity, electrical properties, magnetic properties, malleability, gravitational properties, and imaging properties, can be detected, monitored, located, and visualized by device software, and also provide Cartesian coordinate information of the ball to the positional detection system, and also providing additional information such as the rotation pattern of the ball. The system, depending on the chosen properties for assessment, would require corresponding sensors around the three-dimensional space of play, such as within the goalposts, or on the equipment or attire used by the participants of the sport, such as clothing, to measure the interactions of the ball, such as force, pressure, and speed, with its environment. The ball does not need to be in physical contact with the sensors for interactions to be detected and measured. The extra sensors would be placed at desired positions around the playing environment, and, for example, a high resolution, symmetrical grid formation of sensor positions is the most appropriate for covering the entire playing environment, such as a football pitch. A similar concept applies to any other ball game activity.

For example, in golf, the position where the golf ball is decided to have stopped moving is of importance to the rules of the sport as the participant then plays the subsequent shot from that position. The invention can be applied to decide in what position the ball has stopped moving or is moving by an insignificant amount by designing the material properties of the ball to be detected by, for example, a set of inductive proximity sensors positioned around the course. The same system could detect the position of the ball during flight for performance analysis, as sensors could position the golf ball in three-dimensional space during the sport.

The same principle explained above for the ball technology above is also applicable to motion capture in games, animation and the film/television industry. Sensors can be used to detect the position of an actor during a stunt in three-dimensional space. The sensors (tracking dot) can be applied to the clothing of the actor or person who is to be filmed or a prop such as a weapon or a stuntcar.

In accordance with a second aspect of the invention, positional information may be provided on a participant and the environment, such as the playing surface, lines, and posts. For example, the invention can be applied to detect if an athlete competing in a jumping discipline has breached the rules of crossing the takeoff marker. A jump is disqualified if any part of the athlete's foot is beyond the takeoff line at the final step of their run-up. The shoes of the athlete have an electrically conductive surface, as does the far edge of the takeoff line and the relevant areas of the runway (the playing surface in this example). The takeoff marker is connected safely to a system at the side of the runway, including a power source such as the electrical mains, a battery, or a solar cell, and the effective circuit increases in length only if any part of the shoe is in contact with the marker. Then the resistance change is detected and a signal, such as a red light, is communicated to the judges. In the same athletic disciplines, this invention can also be used to measure the length of their jumps by using similar principles within the landing environment. This invention can also detect whether participants in sports such as rugby are touching the lines at the edges of the pitch by footwear as well as other garments applied with electrically conductive surfaces.

In accordance with a third aspect, the present invention provides positional information on multiple participants and the environment. For example, in football (soccer), offside decisions are regularly disputed, even with video replays. This invention can be applied to determine where participants are standing on the pitch relative to each other by having a series of effective circuits being associated with different sections of the pitch. The positions of the circuits are undisputed and unaffected by perception and therefore could provide clear data as to where the two participants are standing relative to each other. The entire pitch has been applied with an electrically conductive surface, and a range circuits are safely connected to each defined section in a grid formation with a specific, designed resolution of choice, such as an effective circuit per square centimeter, with a minimum of one-by-one. The grid formation can be applied, for example, by dividing the field of play in rugby into segments, such as the try scoring area, each with their own effective circuit. Any part of the grid can be switched on and off during a game of sport to reduce the number of measurements recorded, depending on the area of interest of the user. For example, the service lines in a game of tennis are only of interest to the umpire in the action of a serve and would be switched off during the rest of the rally.

The positional data of the true, precise locations of each boot or garment at the designed resolution is assigned to individual participants using an individual participant identifying means. The invention has means of assigning individual data if electrically conductive materials of different electrical properties, such as conductivity and thickness, are used for different participants such that the electrical properties of effective circuits has known values defining interactions between, for example, a particular participant and the outside lines defining the edge of a playing surface. The same is true for the application in performance media. Where the positional data of the actors or props can be captured and utilized for the motion capture purposes.

In a fourth aspect, the present invention provides means for performance analysis, in which artificial intelligence is used to analyse the performance of participants based on the positional data collected. Similarly to the third aspect, the system includes individual participant identifying means. Performance analysis is an area of work which spans a variety of sports. The interacting surfaces of the playing environment, player garments, and playing equipment would be required to have electrically conductive coating to a suitable level to assess aspects of in-game performance. For example, in football, the number of touches by a participant and the position on the pitch of each touch could be recorded if the surface of the pitch, the participant's boots, and the ball formed a positional detection system of electrically conductive interacting surfaces as detailed in this invention.

When designing the invention in any such scenario, naturally, among the considerations would be the safety of the participants. Preferably, the voltage or temperature that participants might come into contact with would be of such low value that it has a negligible effect.

The present invention is applicable in numerous scenarios in many different sports, such as ball games, athletics events, aquatic events, or equestrian events. Ball games include but are not limited to sports such as football, tennis, rugby, water polo and golf. Athletics events includes but are not limited to sports such as long jump, running, javelin throwing, and pole vault. Aquatic events include but are not limited to sports such as rowing, swimming, and kayaking. Equestrian events include horseback riding based sports such as horse racing, dressage, and show jumping.

The present invention is also applicable in numerous scenarios in performance media such as accurately capturing human movement in multiple environments and then translating this data using software to produce, for example, animations or creating special effects in television or films.

For example, the electrically conductive surfaces could be formed using nickel-based paint, silver-based paint, or reduced graphene oxide. For example, the invention could be designed so as to include software means such as converting measured input values to clear outputs using computer output means. Any software means may also include artificial intelligence capability, which recommends or makes decision in the role of decision maker and improves understanding using machine learning and training means with an increasingly greater data sample of past inputs and outputs.

The invention claimed is:

1. A sports positional detection system comprising:
   at least two elements each of which has an electrically conductive interactive surface comprising an electrically conductive material which is reduced graphene oxide, nickel-based paint, or silver-based paint;
   a power source connected to at least one element configured to form an electrical circuit when the surfaces of the at least two elements interact; and
   machine-to-machine communication means that is a computing device, which are collectively arranged such that if any two or more elements interact they create a change in the electrical properties in the circuit which can be detected thus allowing the position of the interacting elements to be communicated by the machine-to-machine communication means to an output means.

2. A sports positional detection system as claimed in claim 1, which also includes artificial intelligence software means that is used for performance analysis or decision making.

3. A sports positional detection system as claimed in claim 1 in which the interaction between elements is physical contact.

4. A sports positional detection system as claimed in claim 1 wherein the output means is a visual indicator or an audio indicator which alerts a decision maker.

5. A sports positional detection system as claimed in claim 1 in which there is at least one element that is stationary and at least one element that is capable of movement.

6. A sports positional detection system as claimed in claim 5 in which the element capable of movement is at least one participant.

7. A sports positional detection system as claimed in claim 6 in which the interacting elements are incorporated in the participant's footwear.

8. A sports positional detection system as claimed in claim 6 in which the interacting elements are incorporated in the participant's garment.

9. A sports positional detection system as claimed in claim 6 in which a relative position of at least two participants is detectable in relation to at least one stationary element.

10. A sports positional detection system as claimed in claim 6 in which a relative position of at least two participants to each other is detectable.

11. A sports positional detection system as claimed in claim 6 in which the system also comprises an individual participant identifying means.

12. A sports positional detection system as claimed in claim 5 in which the element capable of movement is a ball.

13. A sports positional detection system as claimed in claim 12, comprising:
- at least one first element which has electromagnetic properties and at least one second element which comprises at least one electromagnetic sensor, wherein the first element is sporting apparatus, and wherein the at least one electromagnetic sensor is configured to detect the first element in a three-dimensional space; and
- machine-to-machine communication means, which are collectively arranged to detect and communicate a change in the electromagnetic field thus allowing the position of the first element to be communicated by the machine-to-machine communication means to an output means.

14. A sports positional detection as claimed in claim 12 in which the element which is capable of movement is capable of doing so in any medium.

15. A sports positional detection system according to claim 13, wherein the system further comprises a grid and at least one electromagnetic sensor is positioned on the grid to allow detection of the first element in a three-dimensional space.

16. A sports positional detection system as claimed in claim 13 wherein the sporting apparatus is a ball.

17. A sports positional detection system as claimed in claim 1 in which the stationary element is the playing surface.

18. A sports positional detection system as claimed in claim 17 in which the stationary element is at least one line which defines the boundaries of the playing surface in a game of sport.

19. A sports positional detection system as claimed in claim 1 in which the system comprises multiple effective circuits in a grid formation.

20. A sports positional detection system as claimed in claim 1 for use in sport, wherein the sport is selected from the group consisting of:
(i) a ball game;
(ii) an athletics event;
(iii) an aquatics event; and
(iv) an equestrian event.

21. A sports positional detection system as claimed in claim 1 wherein at least one element of the at least two elements comprises reduced graphene oxide.

22. A sports positional detection system as claimed in claim 1 wherein at least one element of the at least two elements comprises nickel-based paint.

23. A sports positional detection system as claimed in claim 1 wherein at least one element of the at least two elements comprises silver-based paint.

* * * * *